May 13, 1958     J. B. YOUNG     2,834,567

CAMERA TRIPOD ADAPTER

Filed March 30, 1954

*INVENTOR.*
JAMES B. YOUNG
BY
Buckhorn and Cheatham
*ATTORNEYS*

United States Patent Office 2,834,567
Patented May 13, 1958

2,834,567

CAMERA TRIPOD ADAPTER

James B. Young, Salem, Oreg.

Application March 30, 1954, Serial No. 419,741

1 Claim. (Cl. 248—187)

My present invention comprises an adapter for detachably mounting a camera on a tripod, the adapter comprising a pedestal which is to remain attached to the camera at all times, a support which is to remain attached to the tripod at all times, and clamping means associated with the support and engageable with the pedestal for permitting rapid mounting or dismounting of the camera. A principal object of the present invention is to provide means whereby a photographer may quickly change cameras without disturbing the arrangement of a tripod so as to secure different types of views of the same scene before the scene or lighting conditions change. The utmost utility of the present invention is realized by a person having a plurality of cameras each having secured thereto a pedestal of the present invention, and one tripod having secured thereto a support of the present invention, thus permitting him to arrange the tripod in the desired position and rapidly interchange cameras to secure the different types of views. For example, a photographer may have a camera loaded with black and white film and a second camera loaded with color film, which may be interchangeably mounted on the tripod with a minimum of time between taking a view in black and white and a view in color or, for example, a movie camera may be replaced by a still camera prior to the time that the central objects of the picture have moved beyond range.

A principal object of the present invention is to provide a device of the foregoing character in which the pedestal may be secured firmly to the camera in such relation thereto as to have the lens of the camera properly directed when the pedestal is secured on the support. The photographer is thus not required to reframe the scene by shifting the tripod when replacing cameras.

The foregoing and other advantages of the present invention will be more readily apparent from inspection of the accompanying drawings, taken in connection with the following specification, wherein like numerals refer to like parts throughout.

In the drawings,

Fig. 1 discloses a side elevation of the present invention in use, portions of a camera and of a tripod being illustrated in broken outline;

Figure 4:
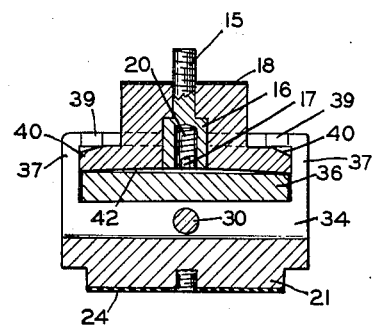
Fig. 4 is a vertical section taken substantially along line 4—4 of Fig. 3.
Figure 5:
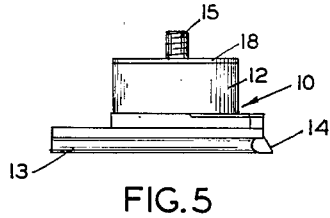
Fig. 5 is a side elevation of the pedestal alone.
Figure 2:
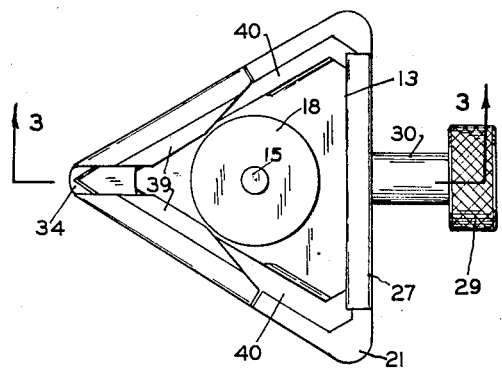
Fig. 2 is a plan view of the invention.
Figure 3:
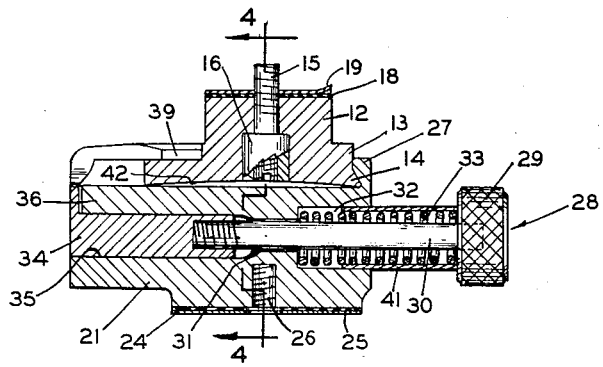
Fig. 3 is a vertical section taken substantially along line 3—3 of Fig. 2.

The pedestal 10 which is adapted to be secured in depending relation on the bottom of a camera indicated at 11, comprises a cylindrical column 12 having a triangular foot 13 thereon at its lower end. The foot is in the form of a regular triangle, preferably but not necessarily an isosceles triangle, and is provided with a projecting rib 14 along the base side thereof. Each of the points of the foot is preferably blunted so as to lessen the chances of injuring a cameraman carelessly reaching for a camera having the pedestal attached thereto. A coaxial opening having an enlarged cylindrical mouth at its lower end extends through the column 12 and rotatably mounts a screw having a threaded stem 15 projecting upwardly for engagement with the usual threaded socket in the bottom of the camera and an enlarged cylindrical head 16 provided with a cross slot 17 for engagement by a screw driver. The upper surface of the column 12 is flat, and a washer 18 of thin, tacky material is adhered to this surface, the washer 18 being similar to electricians' tape or tire patching material and having a protective cover 19 of cloth thereon which is to be removed prior to association of the pedestal with the camera. The protective cover 19 prevents deterioration of the tacky material 18 while the device is in storage, but is removed prior to associating the pedestal with the camera. The tacky material engages the base of the camera and causes firm adherence of the pedestal to the camera, eliminating any chance of relative rotation thereof. The pedestal is firmly mounted on the camera by tightening the screw as much as possible when the sides and base of the triangle are in proper relation to the optical axis of the camera, with the base at right angles to the optical axis. The cylindrical head of the mounting screw is provided with an outwardly opening, threaded, coaxial socket 20 for reception of mounting screws of flash attachments or the like when the camera is separated from the tripod. The lower, substantially horizontal surface of the pedestal is preferably dished as indicated at 42 (Fig. 4) in order that the pedestal may rest on a substantially smooth supporting surface without much frictional engagement therewith, and without requiring accurate smoothing of both surfaces.

A support 21 having a horizontal outline in the shape of a regular triangle is adapted to be mounted upon a tripod such as indicated in dash outline at 22 and which is usually provided with a mounting screw 23. The lower surface of the support is provided with a washer 24 of tacky material protected by a removable layer of cloth 25 as previously described, and the support is provided with a threaded socket 26 for reception of the screw 23. The outline of the support is a regular triangle, equiangular with respect to said foot and having a longer base and longer sides, whereby the pedestal may be centrally disposed thereon with portions of the support extending beyond all three sides of the foot of the pedestal. An undercut gib 27 extends along the base side of the support, terminating short of each end thereof, the groove of the gib being shaped to interlock with the rib 14 when the foot of the pedestal is resting on the flat, horizontal, upper surface of the support. The removable layer of cloth 25 protects the tacky material from deterioration in storage, and is removed prior to association of the support with a camera tripod. The tacky material adheres to the tripod and firmly retains the support in proper relation thereto.

Figure 1:
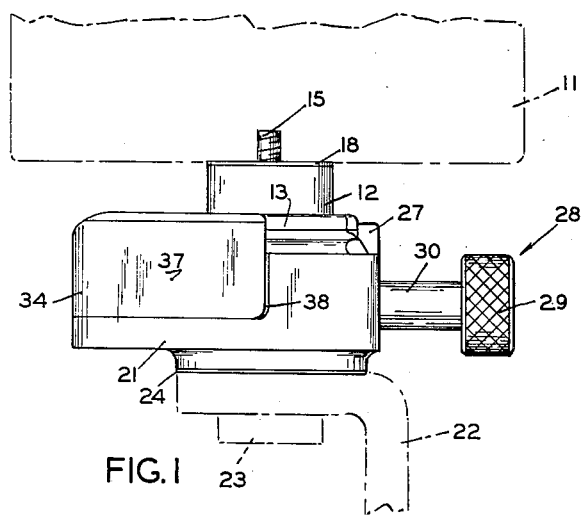

A longitudinally movable plunger 28 including a knurled knob 29 is slidably mounted in the support, the plunger comprising a stem 30 which extends horizontally into the support beneath the upper surface thereof with its axis parallel to the upper surface of the support and bisecting the angle between the sides thereof whereby the plunger extends rearwardly at right angles to the gib 27. The stem 30 is slidably guided in a central bore 31 having an outwardly opening, enlarged coaxial extension 32 facing the rear of the support. A spring 33 is coiled about the stem 30 and is compressed between the bottom of the extension 32 and the inner surface of the knob 29 whereby the plunger is constantly forced rearwardly. The inner end of the stem is affixed to a clamping shoe 34 which comprises a portion slidably guided in a horizontal slot 35 extending outwardly to the sides and apex of the support. The overhanging portion 36 of the support is cut back whereby a pair of vertical walls 37 on the shoe, joined together at their forward edges, may lie flush with the sides of the support when the plunger is retracted rearwardly, the recesses in the sides of the support being indicated at 38. The upper edges of the walls 37 are turned inwardly to provide a pair of overhanging claws 39 adapted to engage portions of the sides of the foot 13 when the pedestal is resting on the support, and the lower surfaces thereof adapted to engage the upper surfaces of the foot adjacent the apex thereof. Preferably the upper surfaces of the sides of the foot are chamfered as indicated at 40 whereby the claws may easily engage over the apex of the foot and firmly press the foot into engagement with the support. A cylindrical sleeve 41 is fixed to the inner surface of the knob 29 and projects inwardly into the enlargement 32 of the bore, the inner end of the sleeve being spaced from the bottom of the enlargement a sufficient distance to permit forward movement of the clamping claws 39 to the extent necessary to permit placing and removal of the pedestal, but providing a limiting abutment against more than the necessary movement. The sleeve 41 surrounds and protects the spring 33, as well as providing means for more firmly guiding the longitudinal movement of the plunger. As seen most clearly in Fig. 1 the relationship of the parts is such that when the claws 39 have firmly engaged the foot and moved the rib 14 into firm engagement with the gib 27, the rear vertical edges of the walls 37 are slightly spaced from the rear vertical edges of the recesses 38, thereby allowing for wear of the parts without lessening the firmness of union of the two parts of the adapter.

In order to attain the objects of the invention, a user obtains one of the supports 21 and several of the pedestals 10, sufficient in number that a pedestal can be permanently attached to each of the user's several cameras. The support is affixed to the camera tripod, and a pedestal is affixed to each of the cameras. After a tripod has been set up in position, with one of the cameras mounted thereon and adjusted so as to have the camera sighted toward the object to be photographed, it is a very simple matter to exchange cameras by pressing the plunger 28 forwardly, while steadying the tripod with the fingers of the hand, until the claws 39 clear the forward portions of the sides of the foot of the pedestal. The camera may thereupon be slid forwardly a slight distance with the other hand until the rib 14 clears the undercut gib 27, whereupon the camera may be withdrawn from the support. It is a simple matter to reverse the process with another camera having a pedestal mounted thereon.

Having illustrated and described a preferred embodiment of the present invention, it should be apparent to those skilled in the art that the same permits of modification in arrangement and detail. I claim as my invention all such modifications as come within the true spirit and scope of the appended claim.

I claim:

An adapter for detachably mounting a camera on a tripod comprising a pedestal, said pedestal comprising a column and a foot at the lower end thereof, said foot having three straight edges defining the base and sides of a regular triangle, means mounted in said pedestal to secure the pedestal to a camera in dependent relation to the bottom thereof, a support adapted to be secured to a tripod, said support having a horizontal outline in the shape of a regular triangle equiangular with respect to said foot and having a longer base and longer sides, an undercut gib extending along the base of said support, a rib extending along the base of said foot and adapted to interlock with said gib when the foot is resting on said support, a longitudinally movable plunger slidably mounted in said support and projecting rearwardly from the base thereof, the axis of said plunger being parallel to the upper surface of said support and bisecting the angle between the sides thereof, said plunger comprising a stem and a manually engageable knob thereon, said support being provided with a bore slidably guiding said stem and said bore having a rearwardly open enlargement at its outer end through which said step coaxially projects, a clamping shoe fixed to the inner end of said plunger, said shoe comprising a pair of walls embracing portions of the sides of said support adjacent the apex thereof, each of said walls comprising a claw facing inwardly and overhanging the upper surface of said support and engaging the top of said foot when it is resting on said support, a spiral spring seated in said bore enlargement in encircling relation to said stem and compressed between said support and said knob to urge said shoe into clamping engagement with said foot and said rib into interlocking engagement with said gib, and a cylindrical sleeve coaxially surrounding said stem and enclosing said spring, said sleeve extending into the enlargement of said bore and slidably engaging the wall thereof, and the ends of said sleeve engaging the inner end of said enlargement and said knob when said plunger is forced inwardly to limit opening movement of said clamping shoe.

References Cited in the file of this patent

UNITED STATES PATENTS

| | | |
|---|---|---|
| 1,602,929 | Parker | Oct. 12, 1926 |
| 2,029,230 | Getz | Jan. 28, 1936 |
| 2,536,170 | Guest | Jan. 2, 1951 |
| 2,615,664 | Reeves | Oct. 28, 1952 |